United States Patent Office 3,500,869
Patented Mar. 17, 1970

3,500,869
FLEXIBLE FLATTENED TUBULAR
OPEN-ENDED ARTICLE
Bruno Bengt Skoggard, Cold Spring Harbor, William Clinton Post, Amityville, and Edward Peter Weierter, Massapequa, N.Y., assignors to American Cyanamid Company, Stamford, Conn., a corporation of Maine
Filed Aug. 2, 1967, Ser. No. 657,980
Int. Cl. F16l 11/00
U.S. Cl. 138—130     6 Claims

ABSTRACT OF THE DISCLOSURE

An article of manufacture comprising a flexible flattened tubular open-ended member which is convertible upon the application of internal fluid pressure and upon hardening of a settable plastic material therein to a hard permanently contoured conduit, said flattened tubular member containing (A) an inflatable imperforate flexible inner tubing surrounded by (B) at least one layer of polymeric material selected from the group consisting of (1) a polyethylene film, (2) a polyester film carrying on both sides a polyethylene film and (3) a paper web prepared predominantly from a synthetic polymeric fiber impregnated with a thermosetting resin and (C) surrounded by at least two layers of a flexible filamentary reinforcing material impregnated with a settable plastic, said filamentary reinforcing material having filaments which cross each other forming girthwise and axial components to accept both axial and girthwise stress, said outermost filamentary layer being covered with (D) at least one protective plastic film outerwrap.

BACKGROUND OF THE INVENTION

Figure 1:
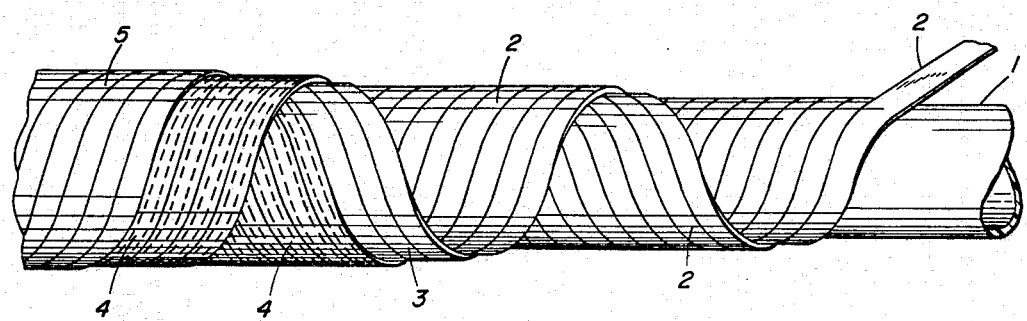

Metal pipes have long been used as conduits for fluids, including gases and liquids. However, when the metal pipe is used with certain corrosive liquids and gases, the life expectancy of the metal pipe is significantly diminished as a general rule. Many of the metal pipes that have customarily been used as conduits lack a significant measure of flexibility and although, more recently, thin metal tubings have been developed which do display an improved measure of flexibility, they are nevertheless comparatively rigid and cannot be utilized in many operations which do require a greater degree of flexibility and strength. Plastic tubings of various types have been developed and for certain purposes they are ideally suited for their end uses. However, even some of these plastic tubings lack the chemical resistance and the strength required, particularly when the fluids forced through the tubings are under significant pressure leading sometimes to ruptures in the tubings which thereby render such plastic tubings undesirable for certain purposes. A great need has developed for an article of manufacture which would be comprised of a flexible flattened tubular open-ended member which is convertible upon the application of internal fluid pressure and upon hardening of a settable plastic material therein to a hard permanently contoured conduit wherein said flattened tubular member contains as the inner lining an inflatable imperforate flexible inner tubing surrounded by at least two layers of a flexible filamentary reinforcing material impregnated with a settable plastic and, preferably, a settable synthetic plastic material wherein the filamentary reinforcing material has filaments which cross each other forming girthwise and axial components to accept both axial and girthwise stress.

FIELD OF THE INVENTION

The field of the present invention is in articles of manufacture comprising flexible flattened tubular open-ended members which can be converted upon the application of internal fluid pressure and upon hardening of a settable plastic material to a hard permanently contoured conduit.

DESCRIPTION OF THE PRIOR ART

The closest prior art of which the instant applicants are aware is the U.S. patent of two of the instant coapplicants, namely, Bruno B. Skoggard and William C. Post, application Ser. No. 323,763, filed Nov. 14, 1963, entitled "Tubular Reinforced Plastic Members," now U.S. Patent 3,329,173, which patent is incorporated herein by reference.

SUMMARY OF THE INVENTION

This invention relates to a significant improvement over the flexible filamentary, flattened tubular open-ended member disclosed and claimed in the U.S. patent referred to immediately hereinabove in the description of the prior art. In the present invention, there is positioned between the inflatable imperforate flexible inner tubing liner and the layers of the flexible filamentary reinforcing material impregnated or coated with a settable thermoplastic resinous material at least one layer of a polymeric material selected from the group consisting of a polyethylene film, a linear polyester resin film carrying on both sides a polyethylene film and a paper web prepared predominantly from a synthetic polymer fiber. These polymeric materials may be used separately from one another or, as will be indicated in greater detail hereinbelow, may be used in combination with one another in indifferent order. These layers of polymeric material may be applied to the inflatable and inflated imperforate flexible inner tubing liner by helically disposing layers of the films around the tubular inner lining in one or more layers, or they may be disposed longitudinally along the long axis of the flexible tubular inner liner. When a plurality of the polymeric materials positioned between the imperforate flexible tubular inner liner are used, some may be wrapped helically around the inflated inner liner followed by others that are disposed longitudinally along the axis of the tubular liner or a plurality of layers of helically disposed layers of the polymeric material may be so positioned that the helix of the first layer is at cross-angles with the helix of the next succeeding layer. Still further, if desired, the first layer of polymeric material positioned above the inflated imperforate flexible inner tubular liner may be disposed longitudinally along the axis of said liner followed by one or more layers of helically disposed polymeric material of the polyethylene inner liner or the linear polyester resin film carrying on both sides a polyethylene film or the paper web prepared predominantly from a synthetic polymeric fiber. Certain advantages are to be achieved by those various alternative modifications which will be discussed in greater detail hereinbelow and the ultimate properties of the various products thereby produced are such that a particular flexible flattened tubular open-ended member can be prepared by practicing the various ramifications of the concept of the present invention so as to provide tailor made products with properties built in to be adapted to particular end uses.

The polymeric material of either polyethylene film or a linear polyester film carrying on both sides a polyethylene film or a paper web prepared predominantly from a synthetic polymer fiber may be of any reasonable width and thickness. These materials may be as narrow as about 1" or as wide as 4" to 6" and are, preferably, about 2" to 3" in width. As applied to the flexible inner tubular liner whether in a helically or radially disposed arrangement or longitudinally along the axis of the conduit, a layer or layers of polymeric material should be positioned in such a way as to provide an overlap of the material in any one layer when considering the next adjacent width of the same disposed material. The thickness of the polymeric material may be varied from 1 or 2 mils to about 25 mils or more. The polyethylene film may be a low density polyethylene film such as one having a specific gravity from about 0.910 to about 0.925 or a medium density polyethylene film having a specific gravity between about 0.926 to about 0.940. High density polyethylene films may be used which have a specific gravity of 0.941 to about 0.965. The linear polyester film carrying on both sides a polyethylene film is a commercially available product and is marketed under the trademark Scotchpak 77, a product of the Minnesota Mining and Manufacturing Company, which is a polyethylene terephthalate film coated on both sides with a medium density polyethylene film, which polyethylene film when heated becomes an adhesive layer. By the same token, the polyethylene films of low, medium or high density are all commercially available from a plurality of sources. The synthetic fiber papers, which are used in making the product of the present invention after having been impregnated with a thermosetting resin, are available from a plurality of commercial sources and may be composed of all synthetic polymer fiber materials or a preponderant amount of polymer synthetic fiber materials such as about 75%, by weight, of the total weight of the paper of the synthetic fiber material, the remainder being inorganic fibrous material such as glass fibers, asbestos fibers, and the like and/or natural organic fibers such as cellulosic fibers, and the like. The synthetic polymeric fiber, from which said papers are made, may be any one of the commercially available fibrous materials such as the linear polyester fibers, nylon fibers, and polyacrylonitrile fibers such as those shown in the U.S. Patent 2,810,646. These polyethylene films or the linear polyester film carrying on both sides the polyethylene film or the synthetic fiber papers impregnated with a thermosetting resin are fusible under the conditions required to harden the tube by the application of internal fluid pressure and heat in producing the final product, namely, a hard, permanently contoured conduit. By the improvement of the present invention, namely, the positioning of the polymeric material on top of the inner tubular member, the ultimate product displays greater chemical resistance, better adhesion between layers, greater strength and a smoother inner surface when the thermosetting resin coated on the filamentary layers is ultimately hardened by the application of heat to a thermoset state.

A further elaboration of the concept of the present invention is the ultization of a web composed fundamentally of synthetic fibers, which web has been impregnated with a thermosetting resin such as an unsaturated polyester resin composition, or a thermosetting epoxy resin, and the like. This resin-rich synthetic fiber paper web may be positioned directly upon the inflatable imperforate flexible inner tubing liner upon which may be positioned either the polyethylene film layer or the polyethylene terephthalate film carrying on both sides a polyethylene film or both in indifferent order then followed by two or more layers of the flexible filamentary reinforcing material coated with the settable plastic. The filamentary material may be any one of a plurality of organic or inorganic filaments such as filaments of cotton, linen, nylon, polyester fiber, polyacrylonitrile fiber or glass fibers or rovings in either woven or unwoven tapes. When natural organic fibers are utilized such as cotton fibers, the treatment with the thermosetting resin is more than a mere coating but instead is properly classified as impregnated as well as coated with the thermosetting plastic material. On the other hand, certain of the synthetic organic fibers and the glass fibers which in cross-sectional appearance are substantially solid rods of very small size, no interstices are to be found on microscopic inspection and, as a consequence, the fibers per se in this category are not impregnated in the true sense of the word, but instead are merely coated. However, the collection of glass fibers in the form of a tape are considered to be impregnated since the interstices between the fibers are impregnated with the resin.

Reference is made to the accompanying drawings in which FIGURE 1 is a front elevational view partly in section of one embodiment of the present invention in which the inflatable imperforate flexible inner tubular liner 1 is wrapped helically with a plurality of overlapping layers of either a polyethylene film or a polyester film carrying on both sides a polyethylene film 2 followed by a series of overlapping helically wrapped layers of polyester film or polyester film carrying on both sides a polyethylene film 3 followed by a plurality of helically disposed layers of filamentary reinforcing material 4 crossing each other with an overlap and impregnated with a thermosetting resinous material, followed by one or more layers of an outerwrap film of cellophane or the like helically wound with overlap 5.

Figure 2:
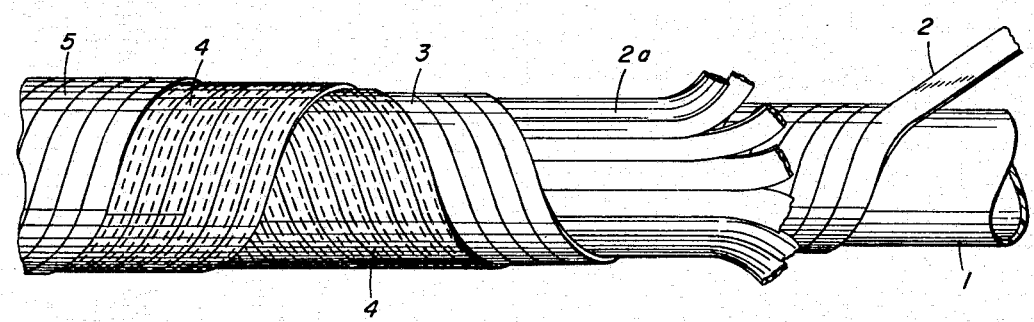

FIGURE 2 is a front elevational view partly in section of another embodiment of the present invention in which the inflatable imperforate flexible inner tubular liner 1 is wrapped helically with one or more overlapping layers of either a polyethylene film or a polyester film coated on both sides with a polyethylene adhesive 2, followed by a layer of longitudinally disposed overlapping layers of a synthetic fiber paper impregnated with a thermosetting resin 2a followed by overlapping layers of helically wound polyester resin film carrying on both sides a polyethylene film 3 followed by helically disposed layers of filamentary reinforcing material 4 crossing each other with an overlap and impregnated with a thermosetting resinous material followed by one or more layers of an outerwrap film of polyethylene or the like helically wound with overlap.

Figure 3:
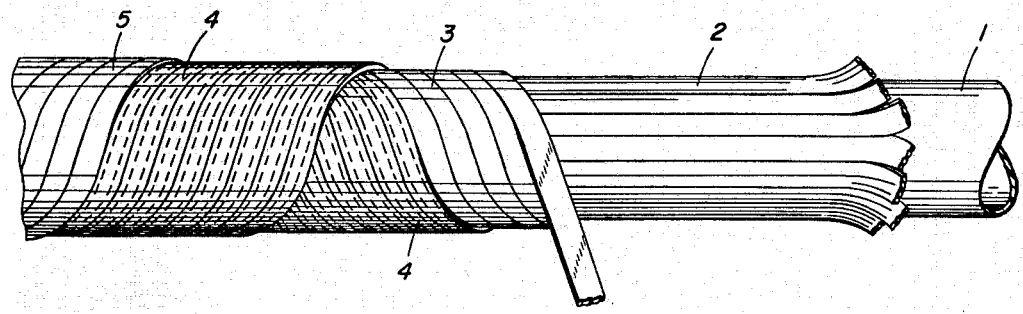

FIGURE 3 is likewise a front elevational view partly in section of a further embodiment of the present invention in which the inflatable imperforate flexible inner tubular liner of a high density polyethylene 1 is wrapped longitudinally with a plurality of overlap layers of either a polyethylene film or a polyester film carrying on both sides a polyethylene film or a synthetic fiber paper impregnated with a thermosetting resin 2 followed by a polyester film 3 followed by helically disposed layers of filamentary reinforcing material 4 which cross each other with an overlap and impregnated with a thermosetting resinous material followed by one or more layers of an outerwrap film of cellophane or the like helically wound with overlap 5.

The width of the film or tapes used in all of the various layers in the construction of the inflatable pipe of the present invention may be varied significantly depending upon individual choice and dictated primarily by the commercially available components that are used in the construction of the tubular product of the present invention. Widths varying between 1″ and about 6″ may readily be used and, preferably, one would use films and tape in widths varying between about 2″ and 4″. The ultimate diameter of the pipe will influence the choice of width of the tapes and films, wherein pipes to be produced having an ultimate diameter of 2″ will require generally narrower tapes such as 1″, 2″, and the like whereas pipes with diameters of 6″ and more can readily be produced from tapes and films having a width of 4″, 5″, 6″ and more. The width of the films, papers, and tapes used in the construction of a given pipe need not be uniform in going from one layer to another and may, in fact, vary in width in any given pipe.

In order that the concept of the present invention may be more completely understood, the following examples are set forth. These examples are set forth primarily for the purpose of illustration and any specific enumeration of detail contained therein should not be interpreted as a limitation on the case except as is indicated in the appended claims.

Example 1

Using the apparatus and process shown in U.S. Patent No. 3,329,173, issued July 4, 1967, a flexible flattened tubular open-ended member is prepared by utilizing a high density polyethylene mandrel which is an inflatable imperforate flexible inner tubing surrounded by one layer of overlapping helically wrapped low density polyethylene film followed by a first layer of glass fiber tape impregnated with a commercially available unsaturated polyester resin composition, containing as the cross-linking monomer, styrene wherein said first glass fiber tape layer is helically wound with overlap followed by an identical glass tape layer superimposed on the first glass layer and also helically wound, but counter to the helically wound first layer. After the second helical layer there is positioned an identical, except for width, group of longitudinally disposed overlapping layers of the same glass tape, followed by a fourth glass tape layer helically wrapped counter to the second helically wrapped layer with overlap, followed by a fifth glass tape layer helically wound counter to the fourth glass layer with overlap. The fifth glass layer is then covered with 2 successive layers of a polyethylene film each wound helically with overlap and, finally, with one layer of a cellophane film helically wrapped as an outer layer with overlap. The last three films constitute the outerwrap and are each helically wrapped in the same direction. These last three films in the outer layer are not imperative, but they do improve the appearance of the pipe and they also prevent the blocking when the pipe is wrapped on a spool or reel in a flattened, reexpandable condition.

Example 2

Example 1 is repeated in all essential details except that in the place of the helically wrapped low density polyethylene layer that is wrapped around the high density polyethylene mandrel there is substituted a helically wrapped, with overlap, synthetic fiber paper impregnated with a thermosetting polyester resin, with overlap.

Example 3

Example 1 is repeated in all essential details except that in the place of the low density polyethylene film layer which is helically wrapped around the high density polyethylene mandrel there is substituted a helically wrapped layer of a linear polyester film carrying on both sides a polyethylene film.

Example 4

Example 1 is repeated again in all essential details except that between the helically wrapped low density polyethylene layer and the first glass tape layer there is applied a helically wrapped synthetic fiber paper impregnated with a thermosetting polyester resin.

Example 5

Example 1 is repeated in all essential details except that there is positioned between the helically wrapped low density polyethylene layer and the first layer of the glass tape helically wrapped layer, a layer of a linear polyester film coated on both sides with a polyethylene adhesive.

In all of the above examples, the mandrel is a seamless high density polyethylene tubular film and all of the glass tape layers had been preimpregnated with an unsaturated polyester resin composition such as those shown in the U.S. Patents 2,255,313, 2,443,735–41, inclusive, of which polyester resins, a substantial plurality are available commercially.

Comparative Example 6

Following the process and using the apparatus of the above-cited U.S. Patent 3,329,173, a flattened, flexible tubular open-ended member is prepared by using as the material of the inflatable imperforate flexible inner tube, a linear polyester resin prepared from ethylene glycol and terephthalic acid (Mylar film). Upon this mandrel there is positioned directly five layers of glass tape oriented in exactly the same manner as in Example 1 hereinabove, followed by the three outerwrap layers exactly as in Example 1.

Example 7

Example 6 is repeated in all essential details except that between the linear polyester film mandrel and the first glass tape layer, there is positioned a plurality of longitudinally arranged overlapped layers of a synthetic fiber paper impregnated with a thermosetting polyester resin.

Example 8

Example 7 is repeated in all essential details except that in the place of the synthetic fiber paper layer there is substituted a layer of high density polyethylene film which is wrapped helically instead of longitudinally as was the case in Example 7.

Example 9

Example 7 is repeated in all essential details except that the synthetic fiber paper impregnated with the resin is wrapped directly around the polyester resin mandrel helically with overlap, followed by a layer of high density polyethylene film helically wrapped with overlap.

Example 10

Example 7 is repeated in all essential details except that the synthetic fiber paper impregnated with the polyester resin is wrapped helically around the mandrel, followed by a layer of a linear polyester film coated on both sides with a polyethylene adhesive helically wrapped with overlap, followed by the glass layers and the outer wrap layers.

Example 11

Example 8 is repeated in all essential details except that there is positioned between the high density polyethylene film layer and the first glass layer a helically wrapped layer of a linear polyester film carrying on both sides a polyethylene film.

Example 12

Example 7 is repeated in all essential details except that there is positioned, on top of the synthetic paper impregnated with the polyester resin longitudinally positioned, a layer of low density polyethylene film helically wrapped with overlap, followed by a layer of high density polyethylene film helically wrapped with overlap, followed by a layer of a linear polyester film carrying on both sides a polyethylene film helically wrapped with overlap, followed by the five glass layers, the first, second, fourth and fifth helically wrapped with overlap, the third longitudinally, and the three outerwrap layers of polyethylene and cellophane film helically wrapped with overlap wherein the helically disposed glass fiber layers are successively reversed with respect to helical wrapping of the preceding helically wrapped glass fiber layers so as to cross one another.

Example 13

Example 8 is repeated in all essential details except that on top of the helically wound high density polyethylene film layer there is positioned a helically wrapped synthetic fiber paper impregnated with an unsaturated polyester resin, followed by the same five layers of glass tape and the three layers of the outerwrap.

Each of the flattened, reexpandable pipes prepared by the processes set forth hereinabove were reexpanded by applying internal pressure sufficient to convert the flat member to a tubular member and subjected to sufficient heat to convert the thermosetting resins therein to a thermoset condition whereupon the pipes in each instance were inspected and, in certain instances, were subjected to a plurality of tests. The first test is the test for pressure to leak water or a "weep pressure" test. This test is conducted by cementing the pipe into two steel end caps, one of which is closed, the other being connected to a pump. The pipe is filled with water. By means of the pump, the internal water pressure is raised at the rate of 100 p.s.i. per minute until 1200 p.s.i. per minute is reached. Then the pressure is raised at the rate of 200 p.s.i. per minute. The weep pressure or pressure to leak is taken as the pressure when the first drop of water comes through the pipe.

The second test is the cycling test. This test is conducted by cementing a pipe into two steel end caps, one closed, the other open. The pipe is filled with water and connected to a pump and pressure release valve. The pump raises the pressure quickly to 1000 p.s.i., when the pressure release valve opens dropping the pressure to zero. This occurs 40 times (or cycles) per minute. Failure is the number of cycles when the first drop of water comes through the pipe.

The results of the tests are set forth in the following table.

TABLE I

| Example | Internal Appearance | Adhesion | Pressure to Leak Water, p.s.i. | Number of 0–1000 p.s.i. Cycles to Failure |
| --- | --- | --- | --- | --- |
| 1 | Fair | Poor | (*) | (*) |
| 2 | do | Good | (*) | (*) |
| 3 | Good | Fair | >2,200 | 76,680 |
| 4 | do | Good | (*) | (*) |
| 5 | do | do | 1,400 | >8,600 |
| Comp. 6 | Poor |  | 300 |  |
| 7 | Fair | Good | 500 |  |
| 8 | do | Fair | 600 |  |
| 9 | Good | do | 800 | 80 |
| 10 | do | Good | 2,350 | 300,000 |
| 11 | Fair | do | 2,700 | 23,000 |
| 12 | Good | Excellent | >2,500 | 500,000 |
| 13 | Fair | Fair | 300 |  |

*Not tested.

We claim:

1. An article of manufacture comprising a flexible flattened tubular open-ended member which is convertible upon the application of internal fluid pressure and upon hardening of a settable plastic material therein to a hard permanently contoured conduit, said flattened tubular member containing (A) an inflatable imperforate flexible inner tubing surrounded by (B) at least one layer of polymeric material selected from the group consisting of (1) a polyester film carrying on both sides of a polyethylene film and (2) a paper web prepared predominantly from a synthetic polymeric fiber impregnated with a thermosetting resin and (C) surrounded by at least two layers of a flexible filamentary reinforcing material impregnated with a settable plastic, said filamentary reinforcing material having filaments which cross each other forming girth-wise and axial components to accept both axial and girthwise stress, the outermost filamentary layer being covered with (D) at least one protective plastic film outerwrap.

2. An article of manufacture according to claim 1 wherein the layer superimposed on the inflatable imperforate flexible inner tubing is a linear polyester film carrying on both sides a polyethylene film.

3. An article of manufacture according to claim 2 wherein there is disposed, between the inflatable imperforate flexible inner tubing and the polyester film carrying on both sides a polyethylene film, a thermosetting resin rich synthetic fiber paper.

4. An article of manufacture according to claim 2 wherein there is positioned, between the linear polyester film carrying on both sides a polyethylene film and the first layer of the flexible filamentary reinforcing material, a layer of a polyethylene film material.

5. An article of manufacture according to claim 3 in which there is positioned, between the inflatable imperforate flexible inner tubing and the first layer of a polyethylene film, a resin rich synthetic fiber paper longitudinally disposed.

6. An article of manufacture according to claim 1 in which the inflatable imperforate flexible inner tubing is a linear polyester film, followed by a longitudinally disposed layer of synthetic fiber paper with overlap impregnated with a thermosetting resin, followed by a low density polyethylene film helically wrapped with overlap, followed by a high density polyethylene film helically wrapped with overap, followed by a linear polyester resin film carrying on both sides a polyethylene film helically wrapped with overlap, followed by five layers of glass fiber tape impregnated with a thermosetting resin helically wrapped with overlap followed by three layers of outerwrap of thermoplastic film helically wrapped with overlap wherein the glass tape layers, one, two, four and five, are helically wrapped and layers two, four and five are successively reversed helically with respect to the immediately preceding helically wrapped glass fiber layer, the third glass fiber tape being disposed longitudinally.

References Cited
UNITED STATES PATENTS

| | | | |
| --- | --- | --- | --- |
| 882,292 | 3/1908 | Brown | 138—125 |
| 2,213,290 | 9/1940 | Rowe. | |
| 2,690,769 | 10/1954 | Brown | 138—125 |
| 2,969,812 | 1/1961 | De Ganahl | 138—130 XR |
| 3,022,802 | 2/1962 | Lewis | 138—125 |
| 3,062,241 | 11/1962 | Brumbach | 138—125 |
| 3,159,183 | 12/1964 | Brumbach | 138—125 |
| 3,172,427 | 3/1965 | Jackson et al. | 138—125 |
| 3,253,619 | 5/1966 | Cook et al. | 138—125 |
| 3,266,527 | 8/1966 | Ross | 138—129 XR |
| 3,329,173 | 7/1967 | Skoggard et al. | 138—125 |

HERBERT F. ROSS, Primary Examiner

U.S. Cl. X.R.

138—125; 156—393